US008004452B2

(12) United States Patent
Rolfe et al.

(10) Patent No.: US 8,004,452 B2

(45) Date of Patent: Aug. 23, 2011

(54) METHODS AND APPARATUS FOR COORDINATING ADS-B WITH MODE S SSR AND/OR HAVING SINGLE LINK COMMUNICATION

(75) Inventors: Eric G. Rolfe, Sudbury, MA (US); Peter R. Drake, Northborough, MA (US); Peter L. Hoover, Bolton, MA (US)

(73) Assignee: Raytheon Company, Waltham, MA (US)

( * ) Notice: Subject to any disclaimer, the term of this patent is extended or adjusted under 35 U.S.C. 154(b) by 318 days.

(21) Appl. No.: 12/129,855

(22) Filed: May 30, 2008

(65) Prior Publication Data

US 2009/0322588 A1 Dec. 31, 2009

Related U.S. Application Data

(60) Provisional application No. 60/941,342, filed on Jun. 1, 2007, provisional application No. 60/941,034, filed on May 31, 2007.

(51) Int. Cl.
*G01S 13/00* (2006.01)

(52) U.S. Cl. .............................. 342/37; 342/36; 342/38

(58) Field of Classification Search .............. 342/29-40; 701/120

See application file for complete search history.

(56) References Cited

U.S. PATENT DOCUMENTS

| | | | | | |
|---|---|---|---|---|---|
| 5,570,095 | A | * | 10/1996 | Drouilhet et al. | 342/357.07 |
| 5,627,546 | A | * | 5/1997 | Crow | 342/352 |
| 6,195,609 | B1 | * | 2/2001 | Pilley et al. | 701/120 |
| 6,459,411 | B2 | * | 10/2002 | Frazier et al. | 342/455 |
| 6,545,631 | B2 | * | 4/2003 | Hudson et al. | 342/30 |
| 6,952,631 | B2 | * | 10/2005 | Griffith et al. | 701/13 |
| 7,095,360 | B2 | * | 8/2006 | Kuji et al. | 342/29 |
| 7,619,555 | B2 | * | 11/2009 | Rolfe | 342/29 |
| 7,755,532 | B2 | * | 7/2010 | Dooley | 342/36 |
| 2002/0011950 | A1 | * | 1/2002 | Frazier et al. | 342/357.08 |
| 2002/0075171 | A1 | * | 6/2002 | Kuntman et al. | 340/961 |
| 2002/0075179 | A1 | * | 6/2002 | Hudson et al. | 342/30 |
| 2002/0154061 | A1 | * | 10/2002 | Frazier et al. | 342/455 |
| 2009/0248287 | A1 | * | 10/2009 | Limbaugh et al. | 701/120 |
| 2009/0322588 | A1 | * | 12/2009 | Rolfe et al. | 342/37 |

OTHER PUBLICATIONS

Evans, Brian. "A Single Solution to ADS-B?", Avionics Magazine, vol. 29 No. 5, May 1, 2007. Retrived online from; http://www.aviationtoday.com/av/categories/commercial/10779.html.*

Minimum Operational Performance Standards for 1090 MHz Extended Squiter, Automatic Dependent Surveillance-Broadcast (ADS-B) and Traffic Information Services-Broadcast (TIS-B), 2003, vol. 2, pp. 1-349, RTCA, Inc., 1828 L. Street, NW, Suite 805, Washington, DC 20036-513.*

"A TDMA Broadcast Satellite/Ground Architecture for the Aeronautical Telecommunications Network", Analex Corporation, NASA Glenn Research Center, Jun. 4, 2003, retrieved from the internet Jan. 12, 2011 from http://i-cns.org/media/icns/2003/03_A2/A2-02-Shamma.pdf.*

Notification of transmittal of the International Search Report dated May 12, 2009, PCT/US0028/065221.

The International Search Report dated May 12, 2009, PCT/US0028/065221.

(Continued)

*Primary Examiner* — Thomas H Tarcza

*Assistant Examiner* — Peter Bythrow

(74) *Attorney, Agent, or Firm* — Daly, Crowley, Mofford & Durkee, LLP

(57) ABSTRACT

Methods and apparatus for an ADS-B system having a single link for communication and/or ADS-B/Mode-S coordination. With this arrangement, the system communication is efficiently used.

6 Claims, 5 Drawing Sheets

OTHER PUBLICATIONS

Written Opinion of the International Searching Authority dated May 12, 2009, PCT/US0028/065221.
B. Evans, A Single Solution To ADS-B, Avionics Magazine, vol. 29, No. 5, May 1, 2007, pp. 38-41.
Raytheon, ADS-B Information Display, 2007 CNS/ATM Conference, Apr. 23-26, 2007, pp. 1-19.
Hanna, S., et al., Flight Conflict Management System (FCMS), The Design of a Low Altitude General Aviation Free Flight Zone, Air, Systems and Information Engineering Design Symposium, Apr. 24-25, 2003, IEEE, pp. 51-56.
Frain et al., CNS/ATM for Tactical Military Aircraft, The 22nd Digital Avionics Systems Conference Proceedings, Indianapolis, IN, Oct. 12-16, 2003, New York, NY, IEEE, vol. 1, Oct. 12, 2003, pp. 4D11-4D19.
PCT/US2008/065221, PCT Article 17(3)(a) and Rule 40.1 and 40.2(e) Invitation to Pay Additional Fees, dated Feb. 24, 2009 and Partial Search Report.
Brian Evans, A Single Solution to ADS-B?, Avionics Magazine [online], vol. 29, No. 5, May 1, 2007, pp. 38-41.
Raytheon Company, ADS-B Information Display, 2007 CNS/ATM Conference, Apr. 23-26, 2007, pp. 1-19.
Suzan Hanna et al., Flight Conflict Management System (FCMS) The Design of a Low Altitude General Aviation Free Flight Zone, Air, Systems and Information Engineering Design Symposium, 2003 IEE, Apr. 24-25, 2003, Piscataway, New Jersey, pp. 51-56.
Steven Frain et al., CNS/ATM for Tactical Military Aircraft, 22nd Dasc, The 22nd Digital Avionics Systems Conference Proceedings, Indianapolis, Indiana, Oct. 12-16, 2003, pp. 4_D_1_1-4_D_1_9.
Radar Basics, Secondary Radar Technology, www.radartutorial.eu/13.ssr/sr01.en.html pp. 1-21, May 30, 2007.
Radar Basics, "Secondary Radar Technology", www.radartutorial.eu/13.ssr/sr01.en.html, May 30, 2007, 21 pages.
H.D. Griffiths, "Bistatic and Multistatic Radar", Univ. College London, Dept. Electronic and Electrical Engineering, Apr. 28, 2009, 9 pages.
Raytheon, "2009 Disruptive IRAD Project Request Bistatic Surveillance for ADS-B", Tim Donovan, 1 page.
N. Willis, "Bistatic Radar", ISBN 0-89006-427-X, Jan. 1, 2005, 2 pages.
International Preliminary Report on Patentability (Chapter 1 of the Patent Cooperation Treaty, PCT/US2008/065221, date of mailing Dec. 10, 2009, 12 pages.
U.S. Appl. No. 12/578,861, filed Oct. 14, 2009, file through Feb. 26, 2010, 223 pages.

* cited by examiner

METHODS AND APPARATUS FOR COORDINATING ADS-B WITH MODE S SSR AND/OR HAVING SINGLE LINK COMMUNICATION

CROSS REFERENCE TO RELATED APPLICATIONS

The present application claims the benefit of U.S. Provisional Patent Application Nos. 60/941,342, filed on Jun. 1, 2007, and 60/941,034, filed on May 31, 2007, which are incorporated herein by reference.

BACKGROUND

As described by the FAA (Federal Aeronautics Administration) ADS-B is an air traffic control (ATC) system that uses signals from Global Positioning Satellites (GPS), instead of radar data, to keep aircraft at safe distances from one another. The ADS-B system provides air traffic controllers and pilots with accurate information that will help keep aircraft safely separated in the sky and on runways. With ADS-B some of the responsibility for keeping safe distances between aircraft is shifted from air traffic controllers on the ground to pilots who will have displays in the cockpits showing air traffic around them.

Conventional air traffic control systems require multiple communication links due to spectrum congestion at a single frequency, such as 1090 MHz. Conventional air traffic control systems include in addition to a link at 1090 a second link known as UAT (Universal Access Transceiver) at 978 MHz for use by General Aviation (GA) for air traffic data. Thus, GA is 'incommunicado' with commercial ATC, and does not show up on ATC displays. Since commercial and GA aircraft, and ATC systems, have a need to be aware of aircraft, the so-called dual-link configuration forms a part of the conventional FAA ADSB. It would be desirable to provide a system that overcomes the need for multiple communication links in air traffic control systems.

BRIEF DESCRIPTION OF THE DRAWINGS

The foregoing features of this invention, as well as the invention itself, may be more fully understood fiom the following description of the drawings in which.

DETAILED DESCRIPTION

Figure 1:
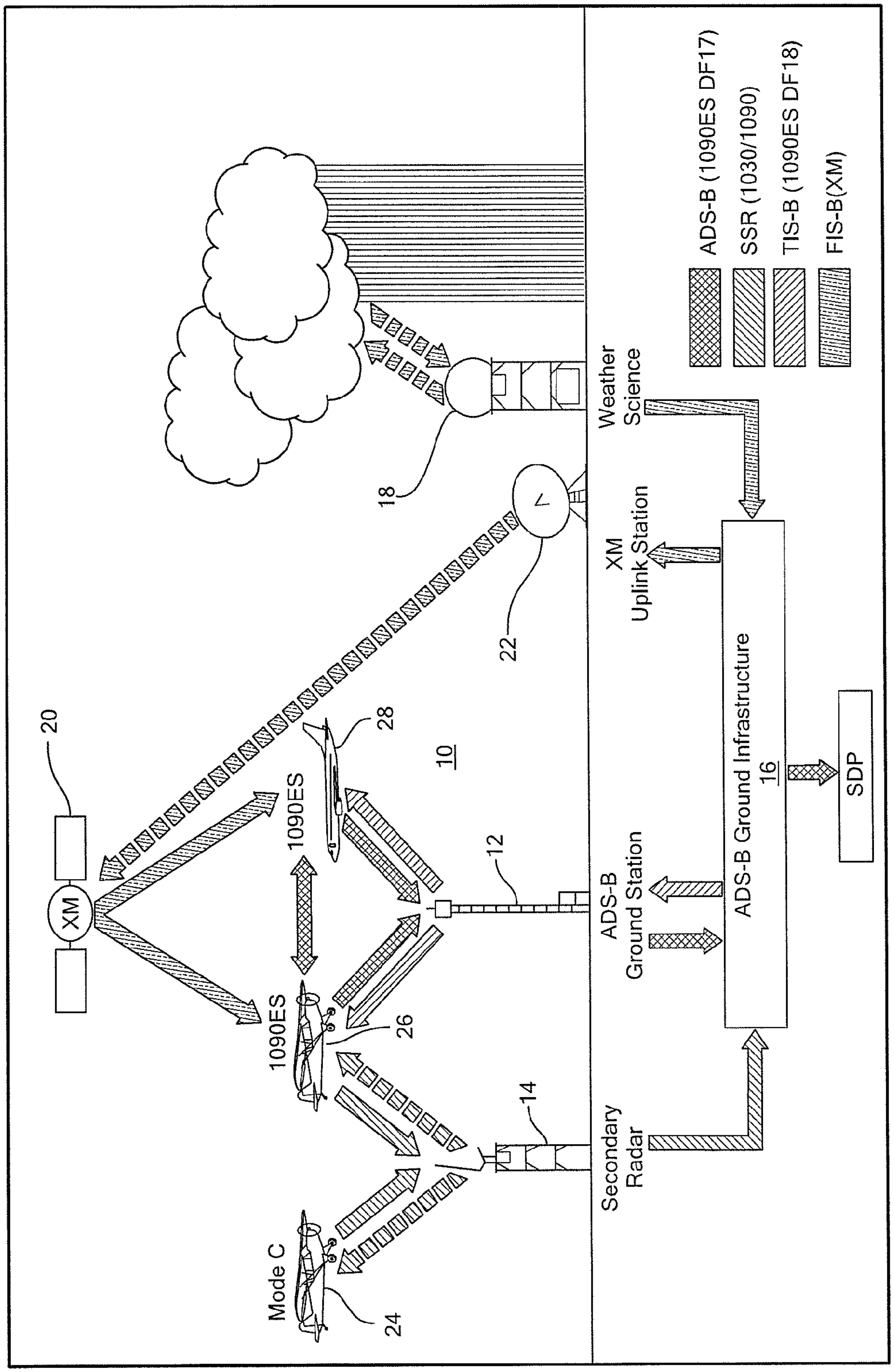
FIG. 1 is a schematic diagram of an air traffic control system.

Before describing exemplary embodiments of the invention, some introductory information is provided. In general, ADS-B systems work by having aircraft receive GPS signals and use them to determine the aircraft's precise location in the sky. The aircraft's avionics system uses this position for precise navigation, and also broadcasts it along with other data from the aircraft's flight monitoring system, such as the type of aircraft, its speed, its flight number, and whether it is turning, climbing, or descending. The data is automatically broadcast by the aircraft transponder periodically (typically once or twice a second) using either the 1090 MHz Mode S Extended Squitter (1090ES) or the 978 MHz Universal Access Transceiver (UAT). Both technologies are approved for use in the National Airspace System (NAS), with 1090ES being predominantly used by the commercial airlines and UAT being used by the General Aviation community.

Aircraft equipped to receive the data, and ADS-B ground stations up to 200 miles away, receive these broadcasts. ADS-B ground stations add radar-based targets for non-ADS-B-equipped aircraft to the mix and send the information back up to all equipped aircraft on both frequencies—this function is called Traffic Information Service-Broadcast (TIS-B). ADS-B ground stations also send aircraft information from the national weather service and flight information, such as temporary flight restrictions—this is called Flight Information Service-Broadcast (FIS-B).

Pilots see this information on their cockpit traffic display screens. Air traffic controllers will see the information on displays they are already using, when adapted to process this new data source.

When properly equipped with ADS-B, both pilots and controllers see the same real-time displays of air traffic. Pilots will have much better situational awareness than in conventional systems because they will know where their own aircraft are with greater accuracy, and their displays will show them the aircraft in the air around them. Pilots will be able to maintain safe separation from other aircraft with fewer instructions from ground-based controllers. At night and in poor visual conditions, pilots will also be able to see where they are in relation to the ground using on-board avionics and terrain maps.

ADS-B also increases airport and air corridor capacity, because the more accurate tracking means aircraft will be able to fly safely and more predictably with less distance between them. And, because ADS-B accuracy also means better predictability, air traffic controllers will be better able to manage the air traffic arriving and departing from congested airports, resulting in even more gains in capacity.

The automatic function of ADS-B eliminates the need for action by a pilot and/or air traffic controller for the information to be issued. The system has dependent surveillance aspect in that the acquired surveillance-type information depends on the navigation and broadcast capability of the source.

An ADS-B system includes a transmitter that includes message generation and transmission functions at the source and a receiver that includes message reception and report assembly functions at the receiving vehicle or ground system.

An Air Traffic Control Radar Beacon System (ATCRBS) system is used in air traffic control (ATC) to enhance radar monitoring of aircraft and aircraft separation. The system acquires information for monitored aircraft and provides this information to the air traffic controllers. This information can be used to identify returns from aircraft and to distinguish those returns from ground clutter.

The system includes aircraft transponders and secondary surveillance radars (SSRs), installed at ATC locations. The SSR transmits interrogations and listens for replies. The aircraft transponders receive interrogations and determine whether to reply.

An ATC ground station typically includes a primary surveillance radar that transmits pulses and receives signal returns from aircraft and a secondary surveillance radar (SSR) having a main antenna and/or an omnidirectional antenna. A primary receives signal return from a target while the SSR receives responses actively transmitted by an aircraft or other object. The relativley high frequency pulses are known as interrogation.

The SSR system scans the area and transmits interrogations over the scan area. The interrogations specify what type of information a replying transponder should send by using a system of modes, e.g., mode 1, mode 2, mode 3/A, mode 4 (IFF), Mode 5, and mode C. Mode S is a discrete selective interrogation that facilitates TCAS for civil aircraft.

A TIS-B system enhances ADS-B systems by providing known aircraft information to pilots. TIS-B is useful for an ADS-B link in airspace where not all aircraft are transmitting ADS-B information. The ground ADS-B station transmits surveillance target information on the ADS-B data link for unequipped aircraft or aircraft transmitting only on another ADS-B link.

The multilink gateway service is a companion to TIS-B for achieving interoperability in low altitude terminal airspace. Aircraft that fly at high altitudes are equipped with 1090ES capability. Aircraft flying at lower altitudes typically have UAT (Universal Access Transceiver), which does not provide air-to-air ADS-B capability. When both types of ADS-B link are in use, ADS-B ground stations use ground-to-air broadcasts to relay ADS-B reports received on one link to aircraft using the other link.

One issue for ADS-B is the capacity for carrying message traffic from aircraft, as well as allowing a link, such as a radio channel, to support legacy systems. The more message traffic there is, the less aircraft can be supported due to bandwidth limitations.

Another issue in ADS-B system is that the increasing volume of air traffic and the emerging use of Automatic Dependent Surveillance creates frequency congestion in the 1090 MHz spectrum which reduces the efficacy of airborne and ground-based surveillance. Reduction in frequency congestion has been a motivation for development of Mode S radar, as well as the development of monopulse SSR radar.

In one aspect of the invention, a single link is used for ADS-B surveillance and air traffic information services. This eliminates the need for a rebroadcast service (ADS-R) and for UAT transmitters. Weather information can be received via a commercial weather information provider, such as XM radio. This arrangement also eliminates reliance on ground structures for communication since air-to-air communication is provided among aircraft.

FIG. 1 shows an exemplary single-link ADS-B system 10 including an ADS-B ground station 12 and a secondary surveillance radar (SSR) 14 coupled via ADS-B ground infrastructure 16. A weather service installation 18 communicates with an XM satellite 20 via an antenna 22. The weather service installation 18 and the antenna uplink 22 are coupled to the ADS-B ground infrastructure 16.

The SSR 14 communicates via Mode C for some aircraft 24 and via 1090ES for other aircraft 26. The ADS-B 12 communicates with aircraft 26 while various aircraft 26, 28 can communicate directly with each other. Some of the aircraft also receive messages from the XM satellite 20.

In an exemplary embodiment, 1090ES is used for ADS-B and TIS-B communication and XM satellite radio for FIS-B communication with a distributed equipment network on the ground. This provides increased capacity, accelerated equipage, and reduced deployment cost compared with known systems.

A single link on 1090ES provides a number of advantages. Antennas and transceivers for UAT link processing and redundant 1090ES transmitters for ADS-R availability is not required at the ground station. In addition, ADS-R of UAT on 1090ES results in equivalent congestion to all aircraft on 1090ES. Further, 1090ES equipage based on Mode S transponders reduces ATCRBS interference. By using a single link, there is no possibility of amplification and rebroadcast of invalid signals, i.e., no spoofing. Also, aircraft receive reports from other aircraft regardless of ground system coverage or failure. UAT aircraft retain Mode C transponders for operation with SSR and TCAS.

Figure 2:
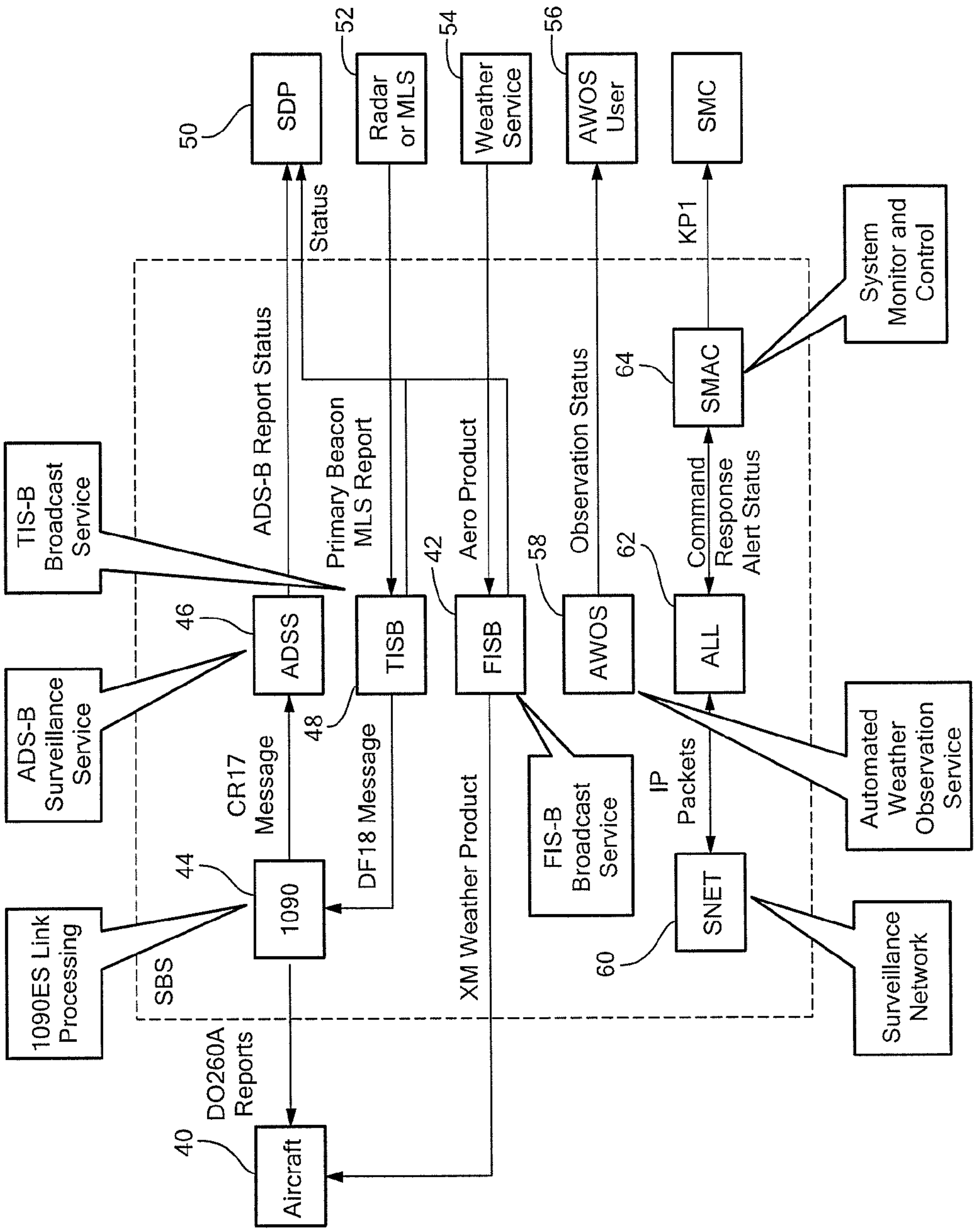
FIG. 2 is a block diagram showing further detail for the air traffic control system of FIG. 1.

FIG. 2 shows further details of the system of FIG. 1, in which the system is partitioned by capability with minimal dependencies allowing independent integration, test, and deployment of ADS-B surveillance, TIS-B and FIS-B services. Link specific processing is separate to minimize the impact of link enhancements.

An aircraft 40 receives XM weather information from an FISB service 42 and communicates via a 1090 MHz link processor 44 with an ADS-B report and status (ADSS) service 46 and a TISB service 48. The ADSS service 46, the TISB service 48, and the FISB service 42 are coupled to the SDP 50. The TISB service 48 receives weather radar information and/or MLS from a service 52. The weather service 54 provides information to the FISB service 42.

A AWOS (automated weather observation service) user 56 receives observation and status information from an AWOS service 58. A surveillance network 60 exchanges packet data with an ALL service 62, which exchanges command, response, alert, and status information with a SMAC (system monitor and control) service 64.

As described above, the ADS-B system depends on aircraft GPS data being transmitted by the aircraft to ground stations via a 1090 MHz broadcast. The system should have the ability to detect spoofing targets. As used herein, a target spoofs when it transmits an incorrect GPS location for itself. The transmission of incorrect data can be due to a malfunctioning GPS of the target, or the system may be under attack by an actor intentionally transmitting false messages. The system should be able to detect that the target is not where the target says it is.

Figure 3:
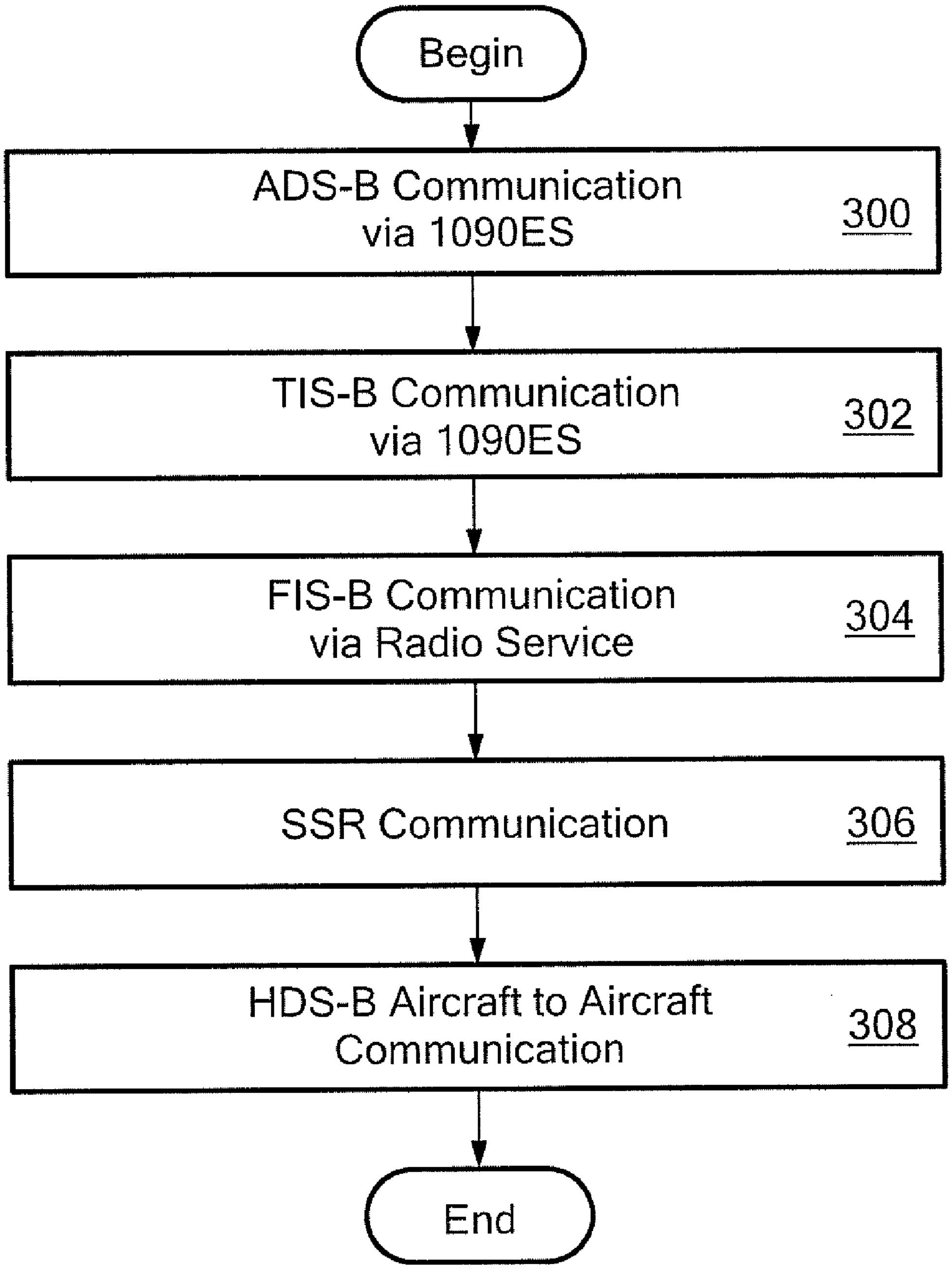
FIG. 3 is a flow diagram showing an exemplary sequence of steps for single link ADS-B communication.

FIG. 3 shows an exemplary sequence of steps for providing single link ADS-B capability in accordance with exemplary embodiments of the invention. In step 300, an air traffic control system communicates with aircraft via 1090ES for ADS-B services. In step 302, the air traffic control system communicates TIS-B services via 1090ES. In step 304, FIS-B information including weather information is provided to aircraft via a radio service, such as XM satellite radio. In step 306, a ground station communicates with an aircraft via Mode C SSR. In step 308, aircraft communicate with each other via ADS-B. It is understood that any suitable weather service can be used instead of XM satellite weather radio.

In one aspect of the invention, exemplary embodiments provide coordination between automatic dependent surveillance—broadcast receivers, and Mode S secondary surveillance radars. In general, the ADS-B receiver transmits the ID and location of an equipped aircraft to the SSR. The SSR transmits a command directly to the equipped aircraft to suppress its response to "all-call" interrogation replies, and subsequently can make only infrequent interrogations of the aircraft to ensure that its position is still consistent with the ADS-B provided one.

In conventional air traffic control systems, addresses or tags are assigned to each aircraft in a surveillance area, such as by Mode-S "squitter" transmitted by the airborne transponder periodically, e.g., once per second. The Mode-S transponder spontaneously transmits (squits) unsolicited broadcasts including the address for the aircraft. When not broadcasting, the Mode-S transponder is listening for transmissions. In addition, ground-based Mode-S interrogators broadcast an "All Call" interrogation signal to which onboard Mode-S transponders respond with a Mode-S transmission that includes the unique aircraft address code along with the aircraft range and azimuth location.

Figure 4:
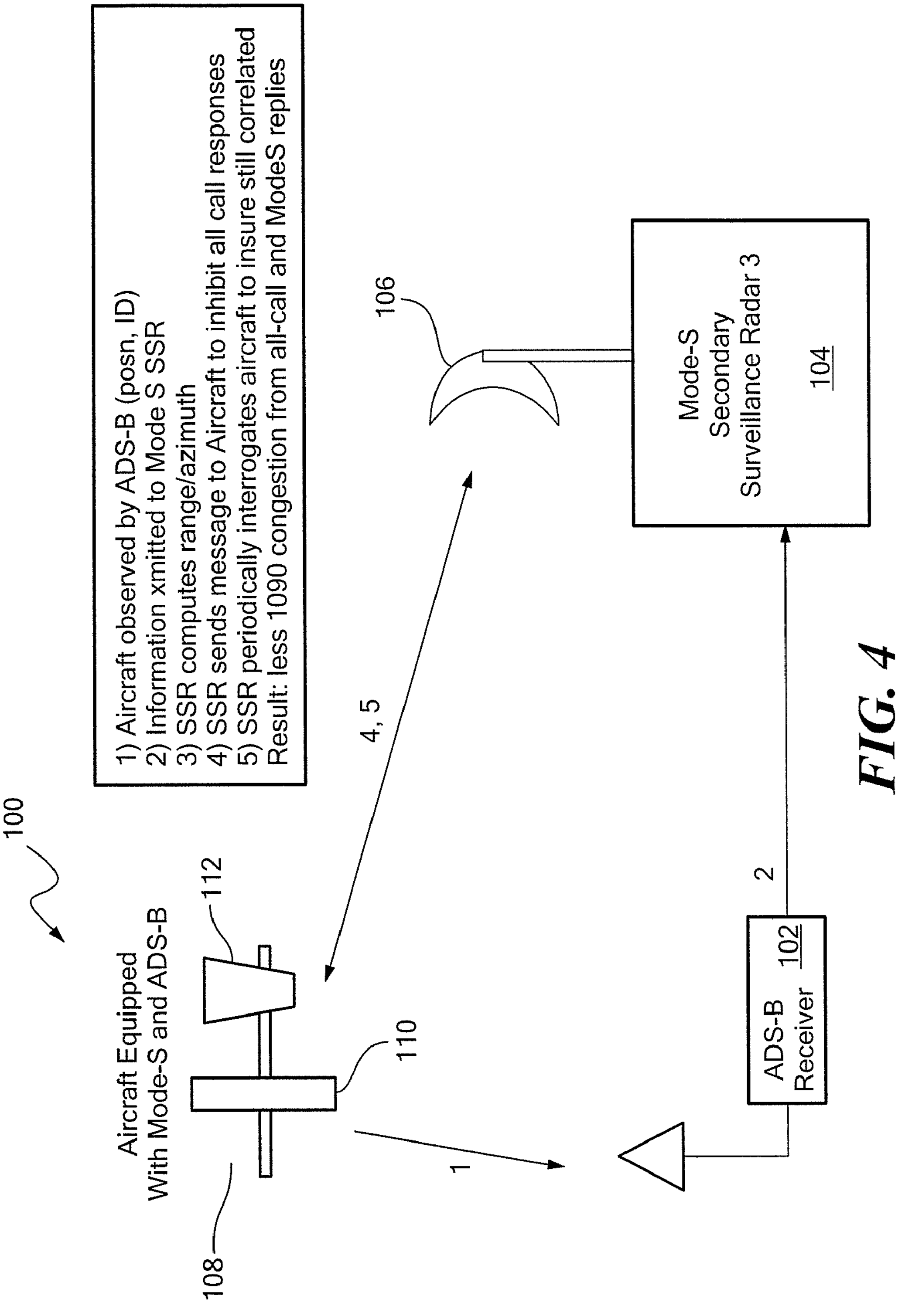
FIG. 4 is a schematic depiction of an air traffic control system having coordination of ADS-B and Mode S SSR.

FIG. 4 shows an exemplary system 100 including an ADS-B receiver 102 coupled to a Mode-S Secondary Surveillance Radar (SSR) 104, which has an antenna 106. An aircraft 108 includes an ADS-B system 110 and a Mode-S system 112.

In operation, the ADS-B receiver 102 detects the aircraft 108 and determines information for the aircraft, such as ID, position, and heading. The ADS-B receiver 102 sends this information to the Mode-S SSR 104, which computes range, azimuth and any other desired information for the detected aircraft 108.

The Mode-S SSR 104 transmits a message to the aircraft 108 for processing by the Mode-S system 112 on the aircraft. The message inhibits Mode-S responses by the aircraft. The Mode-S SSR 104 periodically interrogates the aircraft 108 to ensure continued correlation.

With this arrangement, 1090 MHz message traffic is reduced so that congestion on the Mode-S frequency (1090 MHz) can be relieved. By inhibiting "all-call" responses by the aircraft and Mode-S replies, fewer messages are transmitted for more efficient use of the 1090 MHz frequency.

Figure 5:
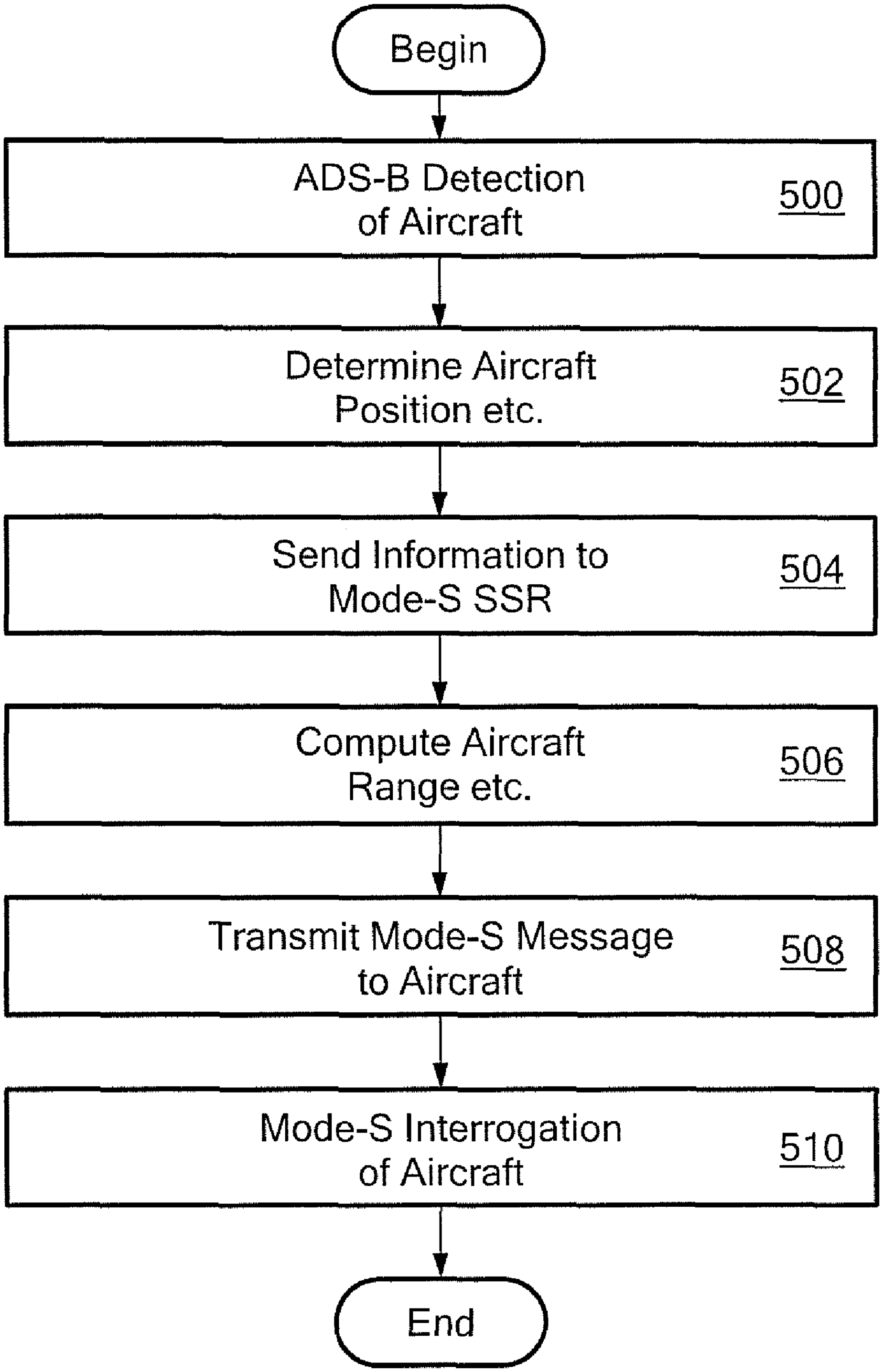
FIG. 5 is a flow diagram showing an exemplary sequence of steps for coordinating ADS-B and Mode S SSR.

FIG. 5 shows an exemplary sequence of steps for providing ADS-B coordination with Mode S SSR. In step 500, an aircraft is detected by an ADS-B receiver. In step 502, the ADS-B receiver determines aircraft information, such as position, heading, and ID. In step 504, the ADS-B receiver sends the information to a Mode-S SSR system. In step 506, the Mode-S SSR computes range, azimuth, and any other desired information for the aircraft.

In step 508, the Mode-S SSR transmits a message to the aircraft instructing the aircraft to ignore Mode-S call responses, such as so-called all-call messages. In step 510, the Mode-S SSR interrogates the aircraft from time to time to make sure the position of the aircraft is known. This arrangement reduces the 1090 MHz message traffic to enhance the overall operation of the system.

It is understood that any practical decoding scheme can be used to provide the necessary message capacity. U.S. application Ser. No. 11/074,316, filed on Mar. 8, 2005, entitled "Secondary Radar Message Decoding," which is incorporated herein by reference, discloses an exemplary secondary radar message decoding scheme.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. An air traffic control system, comprising:

an ADS-B groundstation having a 1090 MHz link to communicate ADS-B and TIS-B information with an aircraft, wherein the ADS-B groundstation does not include ADS-R services for universal access transceivers (UATs) onboard aircraft.

2. The system according to claim 1, wherein FIS-B weather information is provided via satellite radio.

3. An air traffic control system, comprising:

an ADS-B groundstation having a 1090 MHz link to communicate information consisting of ADS-B and TIS-B information with an aircraft, wherein universal access transceivers (UATs) cannot communicate with the air traffic control system.

4. The system according to claim 3, wherein FIS-B information is provided to the aircraft via satellite radio.

5. A method, comprising:

receiving, by an aircraft, ADS-B and TIS-B information from an ADS-B ground station on frequency 1090 MHz; and receiving, by the aircraft, FIS-B weather information from satellite radio;

wherein universal access transceivers (UATs) cannot communicate with the ADS-B ground station.

6. The method according to claim 5, further including receiving ADS-B information from other aircraft.

* * * * *